United States Patent [19]

Yamamoto

[11] 4,135,314
[45] Jan. 23, 1979

[54] PRE-RECORDED MAGNETIC AUDIO TAPE FOR STUDY

[76] Inventor: Takeshi Yamamoto, Fujinodai-Danchi 1-20-106, Honmachida 3486, Machida-shi, Tokyo, Japan

[21] Appl. No.: 837,353

[22] Filed: Sep. 27, 1977

[30] Foreign Application Priority Data

Mar. 22, 1977 [JP] Japan .............................. 52-33384[U]

[51] Int. Cl.² .............................................. G09B 5/04
[52] U.S. Cl. ....................................... 35/8 A; 35/35 C
[58] Field of Search ................................. 35/8 A, 35 C

[56] References Cited

U.S. PATENT DOCUMENTS

| | | | |
|---|---|---|---|
| 2,876,561 | 3/1959 | Horne | 35/35 C |
| 3,118,235 | 1/1964 | Ley | 35/35 C |
| 3,194,895 | 7/1965 | Treadwell | 35/8 A X |
| 3,279,098 | 10/1966 | Taylor | 35/35 C |
| 3,955,466 | 5/1976 | Goldmark | 35/8 A X |

Primary Examiner—William H. Grieb
Attorney, Agent, or Firm—Wenderoth, Lind & Ponack

[57] ABSTRACT

A magnetic audio tape comprising at least two tracks in one direction of advance of the tape is applied for recording with sounds of a sentence for study. The sentence has at least two blank parts each of which can constitute a question for an expected answer, wherein one track of the tape is recorded with the sound of the sentence except for the one blank part of the sentence and the other track of the tape is recorded with the sound of the sentence except for the other blank part of the sentence. The same sound of the sentence recorded on all of the tracks coincides with each other to be reproduced as a single sound when these tracks are scaned at the same time by magnetic head or heads of a tape recorder.

4 Claims, 4 Drawing Figures

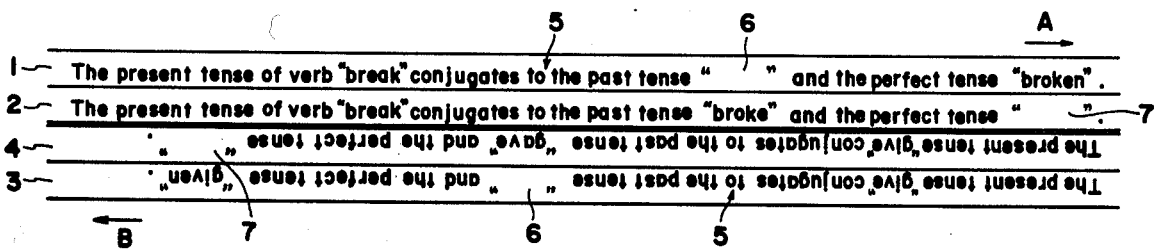

FIG. 1

The present tense of verb "break" conjugates to the past tense " " and the perfect tense "broken".
The present tense of verb "break" conjugates to the past tense "broke" and the perfect tense " ".

FIG. 2

Which do you want this or  ?
Which do you want this    that?

FIG. 3

The present tense "give" conjugates to the past tense " " and the perfect tense "given".
The present tense "give" conjugates to the past tense "gave" and the perfect tense " ".

An insect has wings of four and legs of  .
An insect has wings of      and legs of six.

FIG. 4

America was discovered by         in 1492.
America was discovered by Columbus in      .

PRE-RECORDED MAGNETIC AUDIO TAPE FOR STUDY

BACKGROUND OF THE INVENTION

This invention relates to a pre-recorded magnetic audio tape for study more particularly, to a pre-recorded magnetic audio tape suited for the study of foreign languages and other school subjects such as biology, science and history.

In a known pre-recorded magnetic audio tape, recorded sections constituting questions and answers are provided successively in turn with predetermined intervals in the direction of advance to the tape. Accordingly, a student who wants to study with the aid of such tape set in a tape recorder has first to listen to the recorded question and try to prepare an expected answer in his head within a short period of time before the subsequent recorded answer is reproduced. Then, he confirms whether the prepared answer in this head has been correct or not at the time when the subsequent recorded answer is successively reproduced. Alternatively, the student stops operating of the tape recorder after listening to each recorded question and utters his own answers. Then, by operating the tape recorder again, he confirms whether the uttered answer has been correct or not at the time when the subsequent recorded answer is reproduced.

However, other than such way of study to prepare complete answers after listening to the questions, it is said that high learning effects can be obtained for the studies of foreign language and other school subjects such as science, biology, history or the like when a part or parts of the complete sentence for such studies is made in blank for the expected answer or answers, as can be seen in many drill workbooks for the studies.

SUMMARY OF THE INVENTION

The present invention has been made in view of learning effects obtained in the study of such drill workbooks and, therefore, an object of the present invention is to provide a pre-recorded magnetic audio tape which can provide blank sections in the tape for expected answers of a complete sentence for study but can reproduce correct answers in the blank sections or the complete sentence as desired.

According to the present invention, a magnetic audio tape comprising at least two tracks in one direction of advance of the tape is adapted for use with a tape recorder which can reproduce recorded sounds in plural tracks selectively or simultaneously. A sentence applied for recording in the tape for study has at least two blank parts each of which can constitute a question for an expected answer, wherein one track of the tape is recorded with the sound of the sentence except for one blank part of the sentence and the other track of the tape is recorded with the sound of the sentence except for the other blank part of the sentence. The same sound of the sentence recorded on all of the tracks coincide with each other to be reproduced as a single sound when these tracks are scanned at the same time by magnetic head or heads of the tape recorder.

Preferably, the tape sections at said blank parts of the sentence which constitute questions are recorded with guide sound to notify a user of this tape of the place of the expected answers.

Other objects and features of the present invention will become apparent from the detailed description of preferred embodiments thereof, when taken in conjunction with the accompanying drawings, in which:

BRIEF DESCRIPTION OF THE DRAWINGS

FIG. 1 is an explanatory view showing a magnetic audio tape pre-recorded in accordance with the present invention, which is adapted for the study of irregular conjugation of English verbs, FIG. 2 is an explanatory view showing a magnetic audio tape pre-recorded in accordance with the present invention, which is adapted for the study of English conversation, FIG. 3 is an explanatory view showing a magnetic audio tape pre-recorded in accordance with the present invention, which is adapted for the study of biology, and FIG. 4 is an explanatory view showing a magnetic audio tape pre-recorded in accordance with the present invention, which is adapted for the study of history.

DETAILED DESCRIPTION OF THE INVENTION

Referring to a first embodiment of the present magnetic audio tape shown in FIG. 1, the tape comprises a total of four tracks with first track 1 and second track 2 in one direction of advance of the tape shown by an arrow "A" and third track 3 and fourth track 4 in the other direction of advance of the tape shown by an arrow "B".

A sentence 5 applied for recording in this tape for study or learning comprises at least two blank parts 6 and 7 which can constitute two questions for expected answers. In the first embodiment, the magnetic audio tape is adapted for the study of irregular conjugation of English verbs, that is, for learning the past tense and the perfect tense from the present tense of English verbs. The sentence 5 applied for recording is such one as "The present tense of verb "break" conjugates to the past tense "broke" and the perfect tense "broken"". In this sentence, it is made that two blank parts 6 and 7 which can constitute two questions for expected answers are words "broke" and "broken". The first track 1 is recorded with the sound of the sentence 5 except for the sound of "broke", while the second track 2 is recorded with the sound of the sentence 5 except for the sound of "broken". Upon recording of these sounds on the first and second track 1 and 2, it is required that the same sound on both first and second tracks accurately coincides with each other in such a manner that the same sounds on both tracks can be reproduced as a single sound when both of the tracks are traced or scaned at the same time by a magnetic reproducing head or heads of a tape recorder.

One of the ways to record such that the same sounds on both tracks accurately coincide with each other is to record the complete sentence simultaneously on both of the tracks and then to erase the required sound parts of the sentence, which erased parts constitute questions for expected answers.

The third and fourth tracks 3 and 4, respectively, are also adapted to learn the past tense and the perfect tense from the present tense of English verb "give". The sentence 5 applied to these tracks 3 and 4 is such one as "The present tense "give" conjugates to the past tense "gave" and the perfect tense "given"". The words "gave" and "given" are made to be the two blank parts 6 and 7 of the sentence 5 which sonstitute two questions for expected answers. The recording pattern or manner is the same as mentioned above in connection with first and second tracks.

The magnetic audio tape thus pre-recorded as mentioned above is used together with a tape recorder which can reproduce the recorded sound in one track and the other track selectively or simultaneously. One of such tape recorders widely used is a portable tape recorder for language laboratory (referred hereinafter as "LL tape recorder") which can steplessly change the selection of the two tracks from one to the other by rotating a dial thereon. Usually, the dial takes two extreme positions, one extreme position selecting the first track to reproduce the sound thereon and the other extreme position selecting the second track to reproduce the sound thereon, while the intermediate position therebetween reproduces the both sounds in the first and second tracks. The application of the present tape shall be described hereinafter with the use of the LL tape recorder.

To learn irregular conjugation of English verbs by the pre-recorded magnetic audio tape of the first embodiment shown in FIG. 1, the tape is set to the LL tape recorder as known. When the tape recorder is operated with the dial for selecting the tracks being at the one extreme position, only the recorded sound on the first track 1 is reproduced. Therefore, in the sentence for the study of irregular conjugation of English verb, the recorded sounds of the present tense and the perfect tense are only reproduced, so that the student listening to this reproduced sound can try to prepare the past tense as if he can in the drill workbook having the same blanked sentence as shown in the first track in FIG. 1.

When the dial on the tape recorder in then set to the other extreme position, the student can listen only to the recorded sound on the second track 2. That is, only the recorded sound of the present tense and the past tense can be listened to the student with no sound of the perfect tense of the verb, so that the student can try to prepare the perfect tense of the verb.

On the other hand, when the dial on the tape recorder is set to the intermediate position between the two extremities, the recorder sounds on both of the first and second tracks are reproduced at the same time, so that the sound of the complete sentence 5 is reproduced as if the unrecorded blank sections of the first and second tracks were filled with answer sounds. It should be noted here that the same sounds on both of the first and second track are so recorded as to accurately coincide with each other, so that the reproduced sounds from both of the first and second tracks are single but not doubled.

To learn the irregular conjugation of English verbs pre-recorded on the third and fourth tracks 3 and 4, a cassette containing the magnetic tape is removed from the tape recorder and reversely set in the tape recorder so that the tape is advanced in the direction of arrow B. The other operation of the tape recorder and the way of learning are the same as those of the first and second tracks.

Although the first embodiment of the present invention has been applied to the learning of irregular conjugation of English verbs, the present invention can be applied to many kinds of studies, which shall be described hereinafter in the following embodiments. The drawings of the following embodiments only show two tracks in one direction of advance of the tape (shown by an arrow A) since the pre-recording pattern of the other two tracks is the same as that of the first two tracks.

A second embodiment of the present invention shown in FIG. 2 is adapted for the study of English conversation. A sentence 5 applied for is such one as "Which do you want this or that?". It is made that the first blank part 6 and the second blank part 7 of the sentence which can constitute two questions for expected answers are the words "or" and "that", respectively. The first track 1 is pre-recorded with the sound of the sentence except for the word "that" while the second track 2 is pre-recorded with the sound of the sentence except for the word "or". As in the case of the first embodiment, the same sounds in the both tracks are recorded to accurately coincide with each other.

By using this tape with the LL tape recorder, the student can try to fill the word sound "that" in the unrecorded blank section of the first track 1 by reproducing the recorded sounds on the first track and to fill the word sound "or" in the unrecorded blank section of the second track 2 by reproducing the recorded sounds on the second track. When the both tracks 1 and 2 are reproduced, the complete setence is reproduced as if the unrecorded blank sections in the both tracks are filled with correct sounds of answer words.

A third embodiment of the present invention shown in FIG. 2 is adapted for the study of biology. A sentence 5 applied for is such one as "An insect has wings of four and legs of six.". It is made that the first blank part 6 and the second blank part 7 of the sentence which can constitute two questions for expected answer are the numerals "four" and "six", respectively. The first track 1 is recorded with the sound of the sentence except for the numeral "six" while the second track 2 is recorded with the sound of the sentence except for the numeral "four". The same sounds in the both tracks are recorded to accurately coincide with each other.

Thus, using the tape of the third embodiment with the LL tape recorder, the student can study such biology by trying to fill the unrecorded tape sections in the first and second tracks with the sounds of numerals of "six" and "four", respectively, and can obtain the desired answers of such numerals by reproducing both sounds in the first and second tracks.

A fourth embodiment of the present invention shown in FIG. 4 is adapted for the study of history. A sentence 5 applied for is such one as "America was discovered by Columbus in 1942.". It is made that the first blank part 6 and the second blank part 7 of the sentence which can constitute two questions for expected answers are the word "Columbus" and the numeral "1492", respectively. The first track 1 is recorded with the sound of the sentence except for the word "Columbus" while the second track 2 is recorded with the sound of the same sentence except for the numeral "1492". The same sounds in the both tracks are recorded to accurately coincide with each other.

Thus, using the tape of the fourth embodiment with the LL tape recorder, the student can study such history by trying to fill the unrecorded tape sections in the first and second tracks with the sounds of word "Columbus" and numeral "1492" and can obtain the desired answers of such word and numeral by reproducing both sounds in the first and second tracks.

In all of the embodiments set forth above, in order that the student listening to the pre-recorded sound in the first or second track can easily notice that the unrecorded blank tape sections constitute the question for the expected answers of the sentence, it is preferable to record a small volume of sound such as "pi pi pi" on the blank sections as guide sound for the expected answers. Such guide sound also serves to render indistinguishable a small volume of sound which may be magnetically induced on the tape section in one track from the adjoining other track when a magnetic reproducing head scans said one track.

Although the present invention has been described with reference to reference to the preferred embodiment thereof, many modifications and alterations may be made. For example, the magnetic audio tape may have three or more tracks in one direction of advance of the tape and a sentence for study applied to this tape has three or more blank parts for expected answers, wherein each track has at least one blank section not recorded by the sound of the sentence. Also, the sentence having three or more blank parts for expected answers can be applied to the magnetic audio tape having two tracks in one direction of advance of the tape, wherein one of the tracks has at least two blank sections not recorded by the sound of the sentence.

What is claimed is:

1. A pre-recorded magnetic audio tape comprising at least two tracks in one direction of advance of the tape and adapted to use with a tape recorder which can reproduce recorded sound in one track and the other track selectively or simultaneously, said tape being applied for recording with sound of a sentence for study which has at least two blank parts each constituting a question for an expected answer, wherein one track of said tape is recorded with the sound of said sentence except for said one blank part of said sentence and the other track of said tape is recorded with the sound of said sentence except for the other blank part of said sentence, the same sound of said sentence recorded on all of the tracks coinciding with each other to be reproduced as a single sound when these tracks are scaned at the same time by magnetic reproducing head or heads of the tape recorder.

2. A magnetic audio tape as claimed in claim 1, wherein tape sections at said two blank parts of the sentence are recorded with guide sound extraneous to the sound of said sentence, said guide sounds being adapted to notify a user of this tape of the place of said expected answers.

3. A magnetic audio tape as claimed in claim 1, wherein said sentence adapted for recording on said tape is a sentence for the study of foreign language.

4. A magnetic audio tape as claimed in claim 1, wherein said sentence adapted for recording on said tape is a sentence for the study of school subjects.

* * * * *